(12) United States Patent
Bangalore Srinivas et al.

(10) Patent No.: US 10,689,212 B2
(45) Date of Patent: Jun. 23, 2020

(54) APPARATUS FOR LOADING AND UNLOADING OF FREIGHT

(71) Applicant: Tata Consultancy Services Limited, Mumbai (IN)

(72) Inventors: Venkatesh Prasad Bangalore Srinivas, Bangalore (IN); Venkat Raju Chintalapalli Patta, Bangalore (IN); Swagat Kumar, Bangalore (IN); Rajesh Sinha, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/268,383

(22) Filed: Feb. 5, 2019

(65) Prior Publication Data

US 2020/0115174 A1 Apr. 16, 2020

(30) Foreign Application Priority Data

Oct. 10, 2018 (IN) .............................. 201821038505

(51) Int. Cl.
*B65G 67/20* (2006.01)
(52) U.S. Cl.
CPC .......... *B65G 67/20* (2013.01); *B65G 2201/02* (2013.01)
(58) Field of Classification Search
CPC ........ B65G 67/02; B65G 67/04; B65G 67/20; B65G 67/24; B65G 67/08
See application file for complete search history.

(56) References Cited

U.S. PATENT DOCUMENTS

| 2,627,960 | A | * | 2/1953 | Eberle | B65G 67/08 193/35 TE |
| 3,727,777 | A | * | 4/1973 | Hanson | B65G 67/20 414/400 |
| 4,425,069 | A | * | 1/1984 | Saur | B65G 67/08 104/249 |
| 4,946,027 | A | * | 8/1990 | Jenkins | B65G 21/12 182/2.11 |
| 5,351,809 | A | * | 10/1994 | Gilmore | B65G 21/14 198/594 |
| 5,391,038 | A | * | 2/1995 | Stewart | B65G 67/02 414/392 |

(Continued)

FOREIGN PATENT DOCUMENTS

JP 5526117 7/2013

*Primary Examiner* — Kaitlin S Joerger
(74) *Attorney, Agent, or Firm* — Finnegan, Henderson, Farabow, Garrett & Dunner LLP

(57) ABSTRACT

This disclosure relates generally to an apparatus for loading and unloading of unit loads in freight. A mobile base platform of the apparatus includes a telescopic railing and a telescopic conveyor, wherein the telescopic conveyor is mounted on top of the telescopic railing and the tail end of the telescopic railing is mounted on the front end of mobile base platform. A mechanical connector is adapted to connect the front end of a telescopic conveyor with the front end of the telescopic railing, wherein the mechanical connector enables the telescopic robotic mounting plate coupled to the telescopic railing to move in relation to the telescopic conveyor. The telescopic conveyor and the telescopic railing is moved towards the forward position inside the carrying body, where the forward position movement is enabled by the mechanical link to unload freight.

8 Claims, 6 Drawing Sheets

(56) References Cited

U.S. PATENT DOCUMENTS

| | | | | |
|---|---|---|---|---|
| 6,533,096 | B2* | 3/2003 | Gilmore | B65G 21/14 193/35 TE |
| 6,571,938 | B2* | 6/2003 | Gilmore | B65G 21/14 198/594 |
| 6,823,985 | B2* | 11/2004 | Gilmore | B65G 67/08 198/588 |
| 7,004,308 | B2* | 2/2006 | Parks | B65G 21/14 198/812 |
| 7,108,125 | B2* | 9/2006 | Gilmore | A61K 9/0019 198/313 |
| 7,370,753 | B2* | 5/2008 | Yang | B65G 21/14 193/35 TE |
| 8,397,901 | B2* | 3/2013 | Brouwer | B65G 67/08 198/313 |
| 8,662,291 | B2* | 3/2014 | Henderson | B65G 21/14 198/588 |
| 8,944,239 | B2* | 2/2015 | Campbell | B65G 67/08 198/588 |
| 8,978,871 | B1* | 3/2015 | Guider | B65G 37/00 198/456 |
| 9,004,264 | B2* | 4/2015 | Baek, IV | B65G 67/08 198/588 |
| 9,169,071 | B2* | 10/2015 | Baek, IV | B65G 15/26 |
| 9,422,115 | B1* | 8/2016 | Guider | B65G 37/00 |
| 9,457,970 | B1* | 10/2016 | Zevenbergen | B65G 67/02 |
| 9,688,489 | B1* | 6/2017 | Zevenbergen | B65G 67/20 |
| 10,233,038 | B2* | 3/2019 | Girtman | B25J 9/0093 |
| 10,294,046 | B2* | 5/2019 | Hart | B65G 21/10 |
| 10,315,865 | B2* | 6/2019 | Eto | B25J 9/1687 |
| 10,343,855 | B2* | 7/2019 | Criswell | B25J 9/0093 |
| 10,358,303 | B2* | 7/2019 | Henderson | B65G 67/02 |
| 2005/0279616 | A1* | 12/2005 | Pogue | B65G 21/14 198/812 |
| 2006/0260913 | A1* | 11/2006 | Wolf | B65G 41/008 198/812 |
| 2008/0267756 | A1* | 10/2008 | Echelmeyer | B25J 17/0266 414/749.1 |
| 2009/0067953 | A1* | 3/2009 | Schenning | B65G 67/20 414/140.3 |
| 2009/0169349 | A1* | 7/2009 | Reed | B65G 67/08 414/507 |
| 2012/0255835 | A1* | 10/2012 | Date | B65G 41/005 198/588 |
| 2016/0068357 | A1 | 3/2016 | Bastian, II | |
| 2016/0264366 | A1* | 9/2016 | Heitplatz | B65G 21/14 |
| 2017/0297832 | A1 | 10/2017 | Criswell | |
| 2018/0118476 | A1* | 5/2018 | Bastian, II | B65G 47/90 |
| 2018/0194574 | A1* | 7/2018 | Wagner | B65G 47/12 |
| 2018/0326594 | A1* | 11/2018 | McCollum | B25J 15/0014 |
| 2018/0362270 | A1* | 12/2018 | Clucas | B25J 9/0093 |
| 2019/0291979 | A1* | 9/2019 | Criswell | B65G 67/02 |
| 2019/0352110 | A1* | 11/2019 | Yuvaraj | B25J 19/021 |
| 2020/0010288 | A1* | 1/2020 | McMurrough | B65G 67/24 |

* cited by examiner

APPARATUS FOR LOADING AND UNLOADING OF FREIGHT

PRIORITY CLAIM

This U.S. Patent application claims priority under 35 U.S.C § 119 to: India Application No. 201821038505, filed on Oct. 10, 2018. The entire contents of the aforementioned application are incorporated herein by reference.

TECHNICAL FIELD

The disclosure herein generally relates to an apparatus for handling materials in logistics industry for warehouse management, and more particularly to apparatus for loading and unloading of freight.

BACKGROUND

Automation in material handling is critical for improving processes within an organization. Typically, in logistics industry where material handling is required for warehouses, automation adds time and resource efficiency in the overall process. Materials, alternatively referred as, 'freight' are goods transported in bulk from one place to another by any means of transport such as road, rail, sea and air. Loading and unloading of unit load in freight is by means of a fork lift. The 'unit load' herein refers to a unit packaged product or unit transporting structure of the freight, being lifted by the forklift. Considering large volumes of freight being loaded and unloaded, automation in freight loading and unloading is an area of research.

In an existing system manages automated cargo loading, wherein pallets are loaded onto a trailer according to a selected stacking pattern based on the presence or absence of previously loaded cargo pallets, the distribution of the weight or the cargo to be loaded within the trailer, and a delivery route so that the trailer can be unloaded in sequence with the delivery route. However, due to increasing volume of requirements loading and unloading of unit loads into cargo must result with an efficient compressed automated solution to minimize cost, time and labor.

In another existing system provides a cargo handling system including a gantry and a robotic arm. The gantry is configured to move from a retracted position to an extended position. The robot arm hangs from the gantry. The robot arm is configured to move along the gantry at least when the gantry is in the extended position. The robot arm is configured to handle one or more cargo items. A conveyor is configured to move from a retracted position to an extended position. The conveyor is configured to transport the cargo items to and/or from the robot arm. However, the robotic arm hangs from the gantry loading and unloading of unit loads in cargo limits in the weight of the robot and many conveyor equipment is supported by the floor of the semi-trailer or other cargo space. Human labors have been used manually to load and unload the stack items from/within the cargo space, but such labor intensive activities can be quite expensive and can result in injury to the personnel.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, embodiment of the present disclosure present technological improvements as solutions to one or more of the above-mentioned technical problems recognized by the inventors in conventional systems. For example, in one embodiment, an apparatus for loading and unloading of freight is provided. The apparatus comprises a mobile base platform having a front end and a rear end. The Omni drive wheels position the apparatus into the carrying body of warehouse. Further, the mobile base platform includes a telescopic railing and a telescopic conveyor, wherein the telescopic conveyor is mounted on top of telescopic railing and the telescopic railing is mounted on the front end of mobile base platform. Further, the front end of telescopic conveyor is coupled with the front end of telescopic railing. The robotic arm is adapted on the robotic mounting plate mounted on the telescopic railing. The mechanical connector links the front end of telescopic conveyor and telescopic railing. This mechanical link avoids misalignment occurred while handling of unit loads. Further, the apparatus provides loading of unit loads into carrying body such that the robotic arm placed adjacent to the front end of mobile base platform lifts the unit load from the unit handler unit and places on the telescopic conveyor such that the unit load moves forward towards the robotic arm mounted on the robotic mounting plate. The mechanical link enables the movement of telescopic railing in relation to the telescopic conveyor such that the robotic arm mounted on the robotic mounting plate lifts the unit load from the telescopic conveyor and places on the positioned target. The telescopic conveyor and the telescopic railing is moved towards the backward position from the carrying body, where the backward position movement is enabled by the mechanical link to load freight. Further, the apparatus provides unloading of unit loads from freight wherein the robotic arm mounted on the robotic mounting plate lifts the unit load from the target position and places on the telescopic conveyor. The telescopic conveyor and the telescopic railing is moved towards the forward position inside the carrying body, where the forward position movement is enabled by the mechanical link to unload freight. The unit load travels towards the base conveyor unit of telescopic conveyor to the adjacent placed robotic arm of mobile base platform. The robotic arm lifts the unit load from the telescopic conveyor and places on the unit load handler unit for further handling of unit loads in warehouse.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1A:
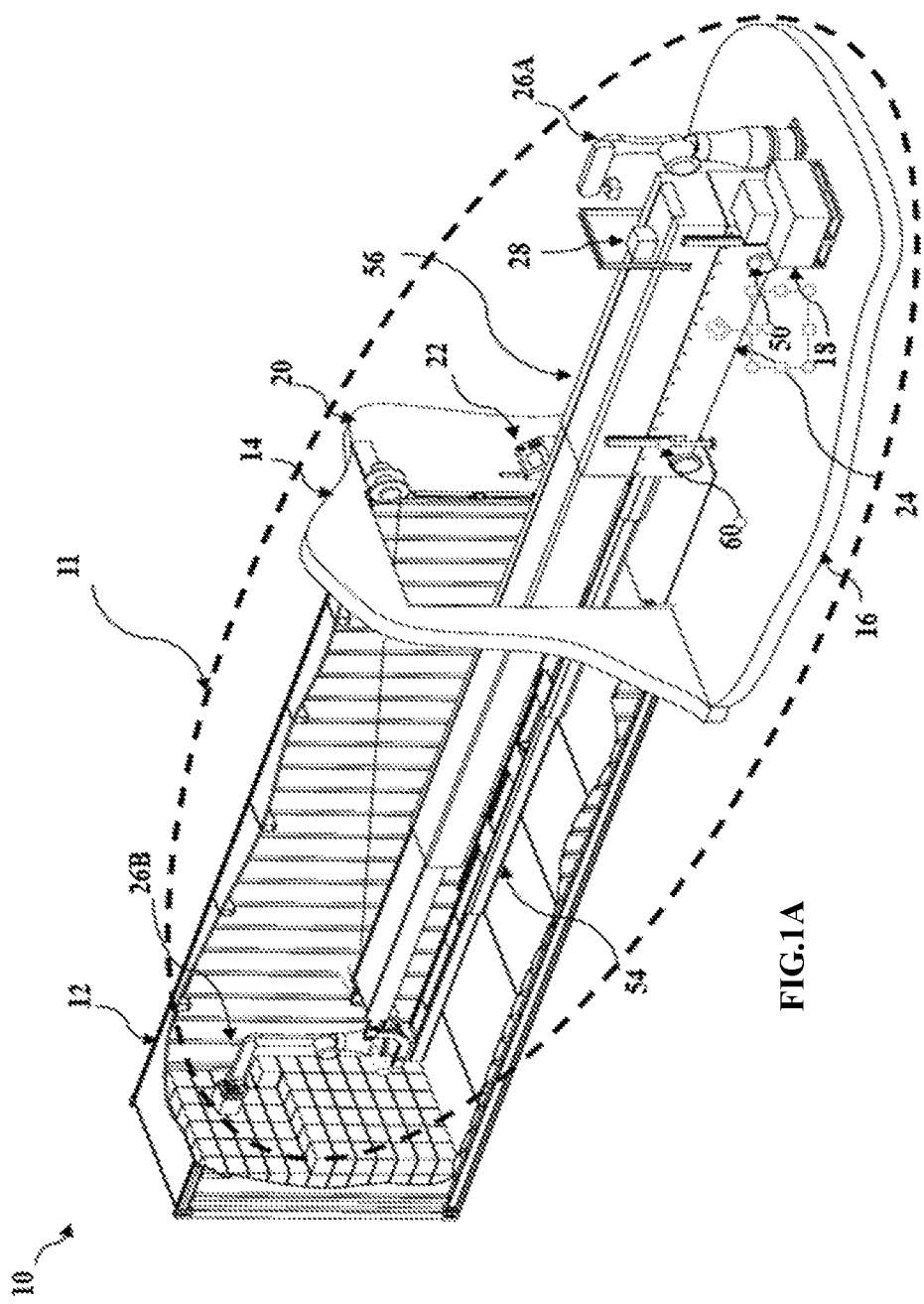
FIG. 1A is a perspective view of a system comprising an apparatus for loading and unloading freight, according to some embodiments in the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1B:
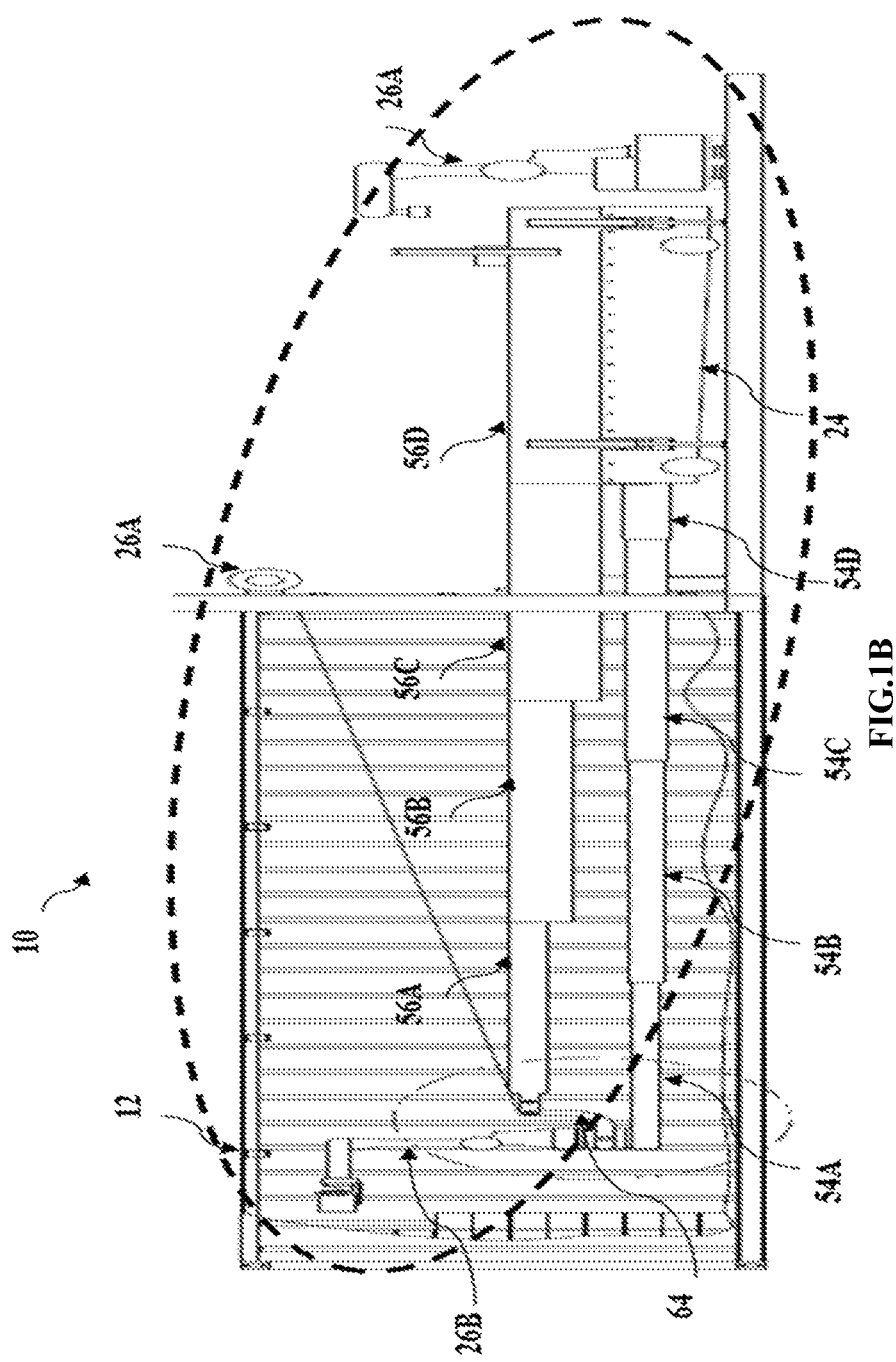
FIG. 1B is a side elevation of the system of FIG. 1A depicting the apparatus for loading and unloading the freight, according to some embodiments in the present disclosure.

FIG. 1A is a perspective view of a system 10 comprising an apparatus 11 for loading and unloading freight, according to some embodiments in the present disclosure and FIG. 1B is a side elevation of the system of FIG. 1A depicting the apparatus 11 for loading and unloading the freight, according to some embodiments in the present disclosure. The system 10 includes a carrying body 12 and an apparatus 11 comprising a base component 16 to mount the apparatus 11 on ground with a support wall 14. The support wall 14 is positioned high so as not to interfere with the carrying body 12, for example body of a container to be loaded or unloaded. The apparatus 11 further comprises a mobile base platform 24 mounted on top of the base component 16 to be positioned at a target position. The target position can be a position within a container being loaded or a position outside the container when a container is unloaded. Unit load handler unit 18 mounted on top of the base component 16 placed adjacent to the mobile base platform 24 to load or unload a plurality of unit loads 28 of freight. A control unit 22 mounted on the base component 16 controls the operation of various components of the apparatus 11. The control unit 22 includes a control module of robotic arm 26A, a control module of robotic arm 26B, a control module of a telescopic conveyor 56, a control module of a telescopic railing 54, a control module of a driver assembly unit and a control unit of safety assembly unit. A driver assembly 20 connected at the top end of support wall 14 controlled by the control unit 22 includes a coil spring wound to expand and retract the telescopic conveyor 56 and the telescopic railing 54 in accordance with a target position desired for positioning the plurality of unit loads. The retraction mechanism includes mechanism for storing energy when the support wall 14 is extended, for example pneumatic systems, hydraulic systems, and regenerative type electrical systems. When the support wall 14 is extended the retraction mechanism stores a part of the energy used to extend the support wall 14 as potential energy. Safety module of the control unit 22 provides a quick indication of the current status of the apparatus 11 for additional safety. Further, one or more safety indicators are adapted at a front end and a rear end of the apparatus 11 that includes a detector to detect the presence of failure of one or more components configured to the control unit 22 during any system misalignment and also to identify the plurality of unit loads to be placed in freight. The control unit 22 having a user interface at the operator platform provides the information related to the one or more components configured to the control unit 22 to detect one or more faults occurred.

The robotic arm 26A coupled to the rear end of the mobile base platform 24 lifts the plurality of unit loads from the unit load handler unit 18 and places the lifted unit load on the telescopic conveyor 56 to be carried into the carrying body 12. A scanner of the robotic arm 26A is configured to the control unit 22 determines the location of the plurality of unit loads and other navigational properties such that the apparatus 11 is positioned to align at the center of freight 10 by measuring the side walls distance of freight 10 and transmitting the alignment information to the control unit 22. Further, a motion capturing device configured to the robotic arm 26A captures an image of the unit load among the plurality of unit loads for processing and transmits the information of unit load to the control unit 22. The robotic arm 26B coupled to the front end of the mobile base platform 24 lifts the unit load among the plurality of unit loads from the telescopic conveyor 56 and position the lifted unit load into the target position of freight 10. The robotic arm 26B equipped with sensor connected to the control unit 22 allows the robotic arm 26B to identify the type of unit load from the plurality of unit loads to be arranged at the target position in accordance with the unit load obtained from the telescopic conveyor unit 56.

Figure 2:
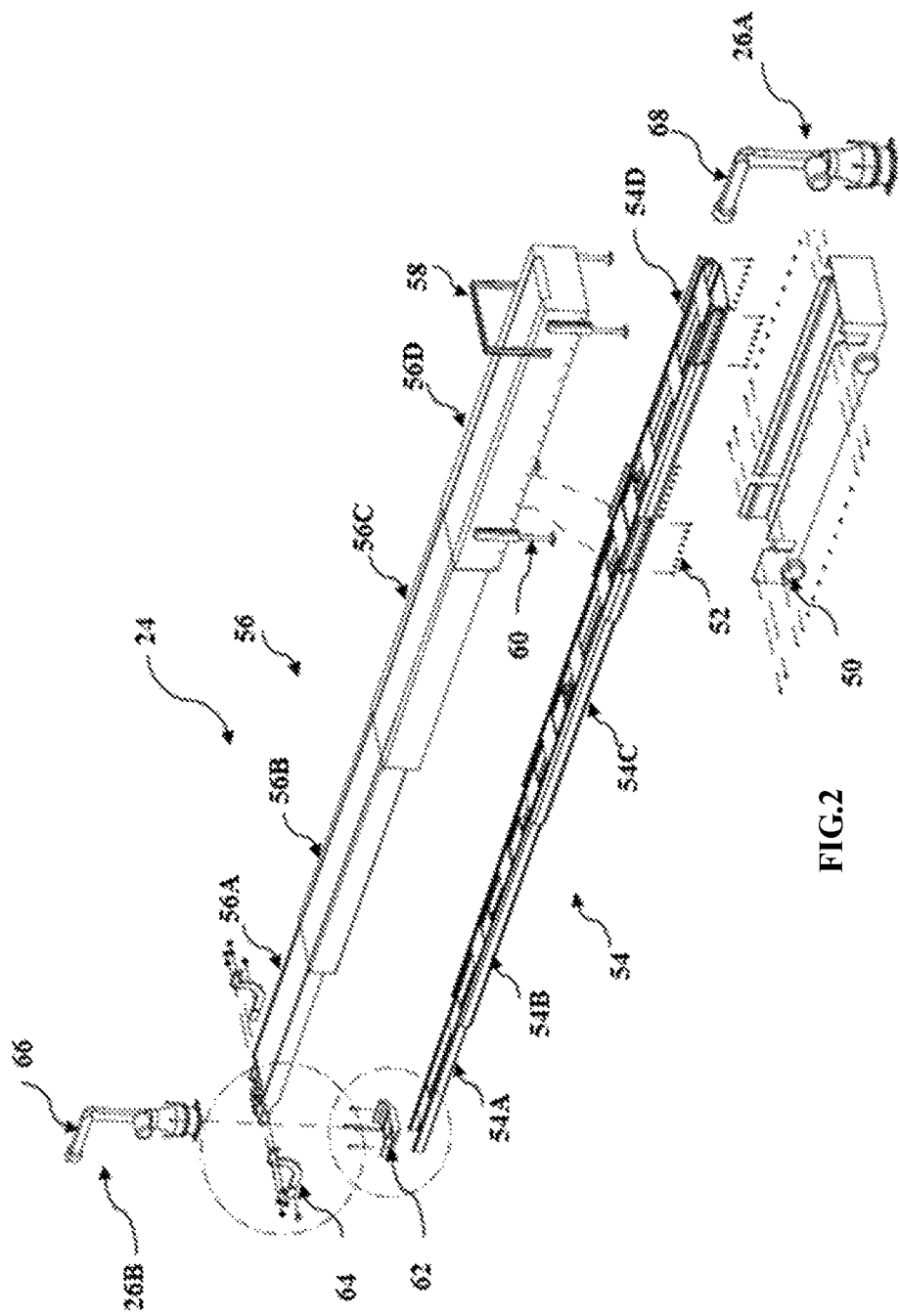
FIG. 2 is a perspective view of a mobile base platform, a telescopic railing and a telescopic conveyor in conjunction with apparatus of FIG. 1A, according to some embodiments in the present disclosure.

FIG. 2 is a perspective view of a mobile base platform, a telescopic railing and a telescopic conveyor in conjunction with apparatus of FIG. 1A, according to some embodiments in the present disclosure. The mobile base platform 24 having a plurality of Omni drive wheels 50 providing the apparatus 11 to drive in forward, reverse and transverse directions. The Omni drive wheels 50 drives the movement of the mobile base platform 24 for macro positioning in freight and micro positioning for centered alignment in freight. A tail end of the telescopic railing 54 mounted on an front end of the mobile base platform 24 includes one or more extendable intermediate rails 54B and 54C between an outer rail 54A and a base rail 54D in which the one or more intermediate rails 54B and 54C, the outer rail 54A and the base rail 54D are interconnected next to each other with mounting brackets and locking screws 52 to extend outwards and retract inwards along with the rails of the telescopic conveyor 56 driven by the mechanism provided by the control unit 22. Hydraulic leveling legs 60 connected to the telescopic conveyor 56 are integrated as support beam to adjust the position of apparatus 11 to be staged at the ground, for example a warehouse. Further, the telescopic conveyor 56, coupled to the tail end of the telescopic railing 54, includes a front end and a tail end placed parallel to the telescopic railing 54. The telescopic conveyor 56 includes an outer conveyor unit 56A telescopically mounted in relation to one or more intermediate conveyor units 56B and 56C and a base conveyor unit 56D. All the conveyor units of the telescopic conveyor 56 are interconnected with each other with mounting brackets and locking screws 52 by a support mechanism with a set of taper rollers that run on conveyor tracks such that the one or more conveyor units can be extended outwards and retracted inwards from the base conveyor unit 56D to the outer conveyor unit 56A in an extension direction from 56B to 56C or vice versa. The telescopic conveyor 56 is placed above the telescopic railing 54 for reliable movement of the telescopic railing 54 with their interconnected rails 54A to 54C in accordance with the telescopic conveyor 56.

The robotic arm 26A, coupled to the control unit 22, is placed at the rear end of the mobile base platform 24. The robotic arm 26A provides movement of an end effector 68 between the unit load handler unit 18 and the telescopic conveyor 56 such that the robotic arm 26A is operable to lift the unit load 28 from the unit handler unit 18 and places the unit load 28 on the telescopic conveyor 56. The unit load 28 may be of any type of goods or objects of any size and shape based on the gripper capability of the selected robotic arm 26A for the apparatus 11 utilized in the warehouse to be accommodated in freight. It should be appreciated that any type of robotic arm 26A may be employed depending upon the type of unit load 28 as illustrated in FIG. 1A to be utilized in warehouse.

The robotic arm 26B, coupled by the control unit 22 and mounted on a robotic mounting plate 62 placed at the front end of the telescopic railing 54 provides movement of an end effector 68 between the carrying body 12 and the telescopic conveyor 56 such that the robotic arm 26B is operable to lift the unit from the telescopic conveyor 56 and places the unit load 28 at the target position inside the carrying body 12. The unit load 28 may be of any type size and shape based on the gripper capability of the selected robotic arm 26B for the apparatus utilized in warehouse. It should be appreciated that any type of robotic arm 26B may be employed depending upon the type of unit load 28 as illustrated in FIG. 1A to be utilized in warehouse. The robotic arm 26B is equipped with a sensor controlled and when controlled by the control unit 22 allows the robotic arm 26B to identify the type, size and shape of the unit load 28 from the plurality of unit loads to be arranged at the target position in accordance with the unit load 28 loading pattern of the telescopic conveyor 56 from unit load handler unit 18. The robotic arm 26B mounted on the robotic mounting plate 62 moves in transverse along with the parallel movement of the telescopic railing 54. A mechanical connector 64 links the telescopic conveyor 56 and the telescopic railing 54 placed in parallel on top of the mobile base platform 24. The robotic mounting plate 62 placed on the front end of the telescopic railing 54 holds the robotic arm 26B for lifting the unit load 28 from the telescopic conveyor 56 and placing the unit load 28 at the target position.

Figure 3A:
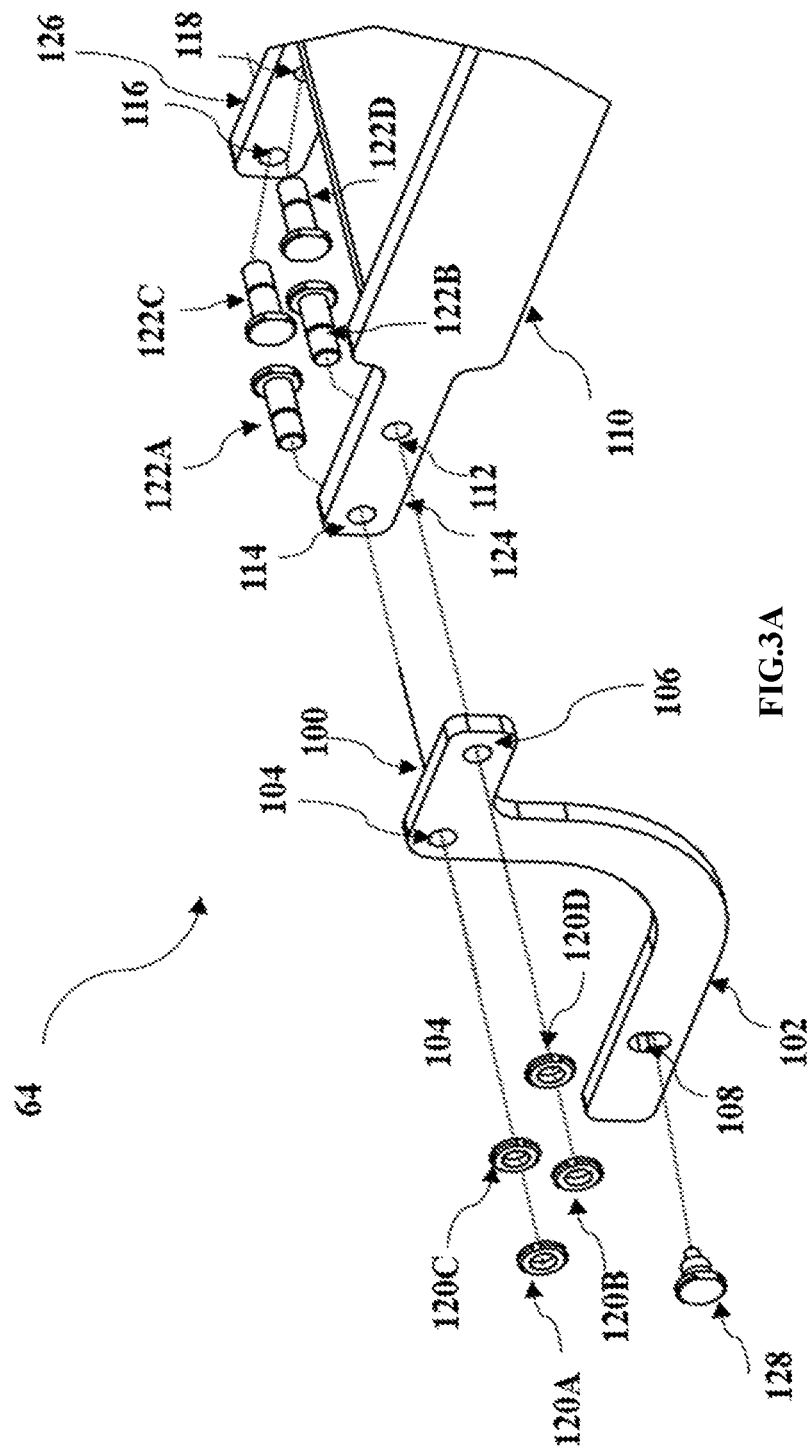
FIG. 3A is an exploded view of a mechanical connector depicted in FIG. 2 adapted in the apparatus of the system for loading and unloading the freight, according to some embodiments in the present disclosure.
Figure 3B:
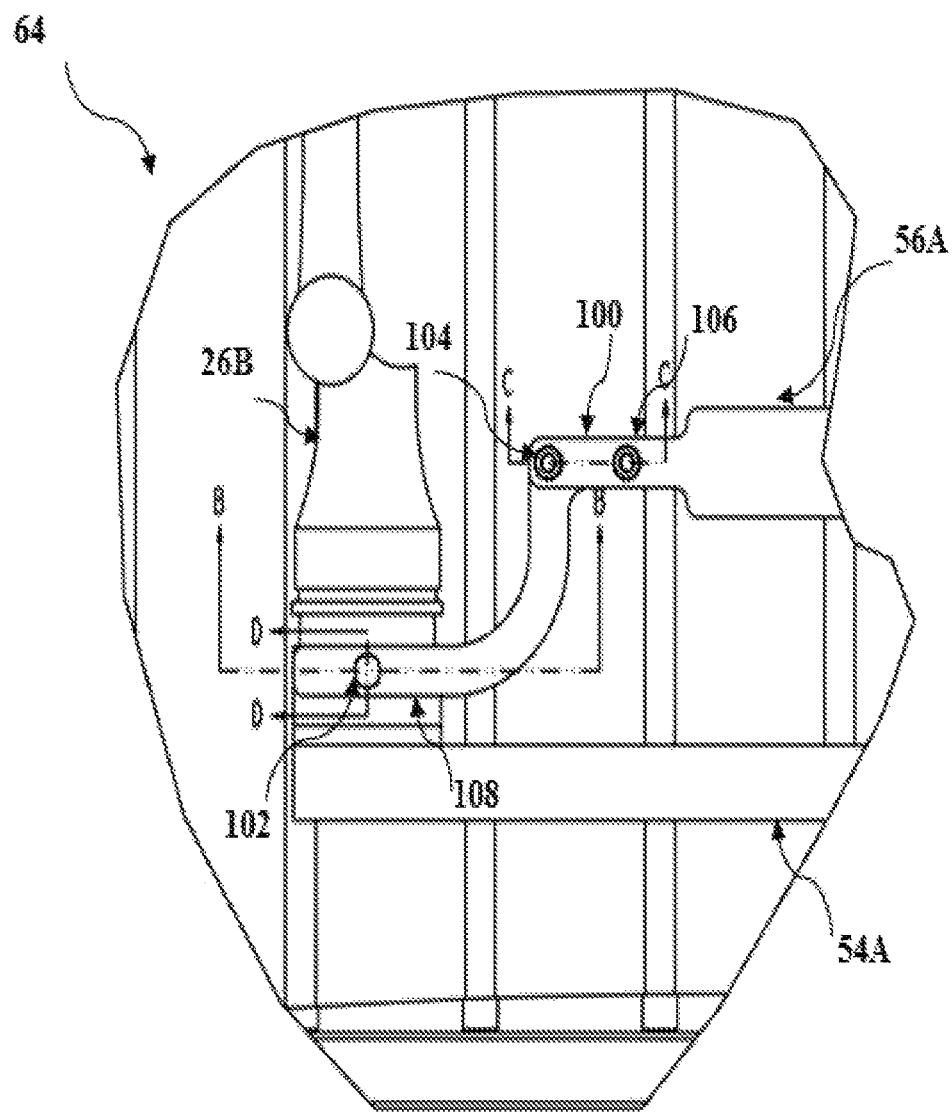
FIG. 3B is side elevation of the mechanical connector depicted in FIG. 2 adapted in the apparatus for loading and unloading the freight, according to some embodiments in the present disclosure.

FIG. 3A is an exploded view of a mechanical connector depicted in FIG. 2 adapted in the apparatus of the system for loading and unloading the freight, according to some embodiments in the present disclosure and FIG. 3B is side elevation of the mechanical connector depicted in FIG. 2 adapted in the apparatus for loading and unloading the freight, according to some embodiments in the present disclosure. The mechanical connector 64 is a half view shaped device including a head end 100 and a tail end 102. The head end 100 of the mechanical connector 64 includes a first aperture as shoulder locating aperture 104 and a second aperture as shoulder anti-rotation aperture 106. The tail end 102 of the mechanical connector 64 includes a single aperture centered as alignment slotted aperture 108. The front end of the telescopic conveyor 56 having an outer conveyor unit 56A includes two parallel ends. The first parallel end 124 includes a first aperture as locating aperture 114 and a second aperture as anti-rotation aperture 112, the second parallel end 126 includes a locating aperture 116 and an anti-rotation aperture 118.

A shoulder locating aperture as first aperture 104 of the head end 100 of the mechanical connector 64 is secured to a first aperture 114 of the first parallel end 124 of the front end of the telescopic conveyor 56. A shoulder lock nut screw 120A is used to secure the first aperture 104 of the head end 100 of the mechanical connector 64 with the shoulder anti-rotating screw 122A of the first end 114 of the first parallel end 124 of the outer conveyor unit 56A of the telescopic conveyor 56. A shoulder anti-rotating aperture as second aperture 106 of the head end 100 of the mechanical connector 64 is secured to a second aperture 112 of the first parallel end 124 of the front end of the telescopic conveyor 56. A shoulder lock nut screw 120B is used to secure the second aperture 106 of the head end 100 of the mechanical connector 64 with the shoulder anti-rotating screw 122B of the first end 114 of the first parallel end 124 of the outer conveyor unit 56A of the telescopic conveyor 56.

A tail end 102 having a first aperture 108 of the mechanical link 64 is secured to an anterior end having a anterior threaded slot 206 of the robotic mounting plate 62 holding the robotic arm 26B. A shoulder stepped screw 128 is used to secure the slot of the centered aperture 108 of the mechanical link 64 with the anterior threaded slot 206 of the robotic mounting plate 62 mounted on the outer rail 54A of telescopic railing 54. The mechanical connector 64 links the telescopic conveyor 54 and the telescopic railing 56 that can actuate the system, wherein the movement of telescopic railing 56 is in accordance with the telescopic conveyor 56. The shoulder stepped screw 128 of the mechanical connector 64 reduces misalignment between the axis movement of telescopic conveyor 56 and the axis movement of telescopic railing 54.

In an embodiment, similarly another mechanical link 64 is connected to the second parallel end 126 of the outer conveyor unit 56A of the telescopic conveyor 56. For example a shoulder locating aperture as first aperture of the head end of the mechanical connector 64 is secured to a first aperture 116 of the second parallel end 126 of the front end of the telescopic conveyor 56. A shoulder anti-rotating aperture as second aperture of the head end of the mechanical connector 64 is secured to a second aperture 118 of the second parallel end 126 of the front end of the telescopic conveyor 56. A shoulder lock nut screw 120C is used to secure the second aperture 106 of the head end 100 of the mechanical connector 64 with the shoulder anti-rotating screw 122C of the second end 116 of the second parallel end 126 of the outer conveyor unit 56A of the telescopic conveyor 56. A shoulder lock nut screw 120D is used to secure the second aperture 106 of the head end 100 of the mechanical connector 64 with the shoulder anti-rotating screw 122D of the second end 118 of the second parallel end 126 of the outer conveyor unit 56A of the telescopic conveyor 56.

Figure 4:
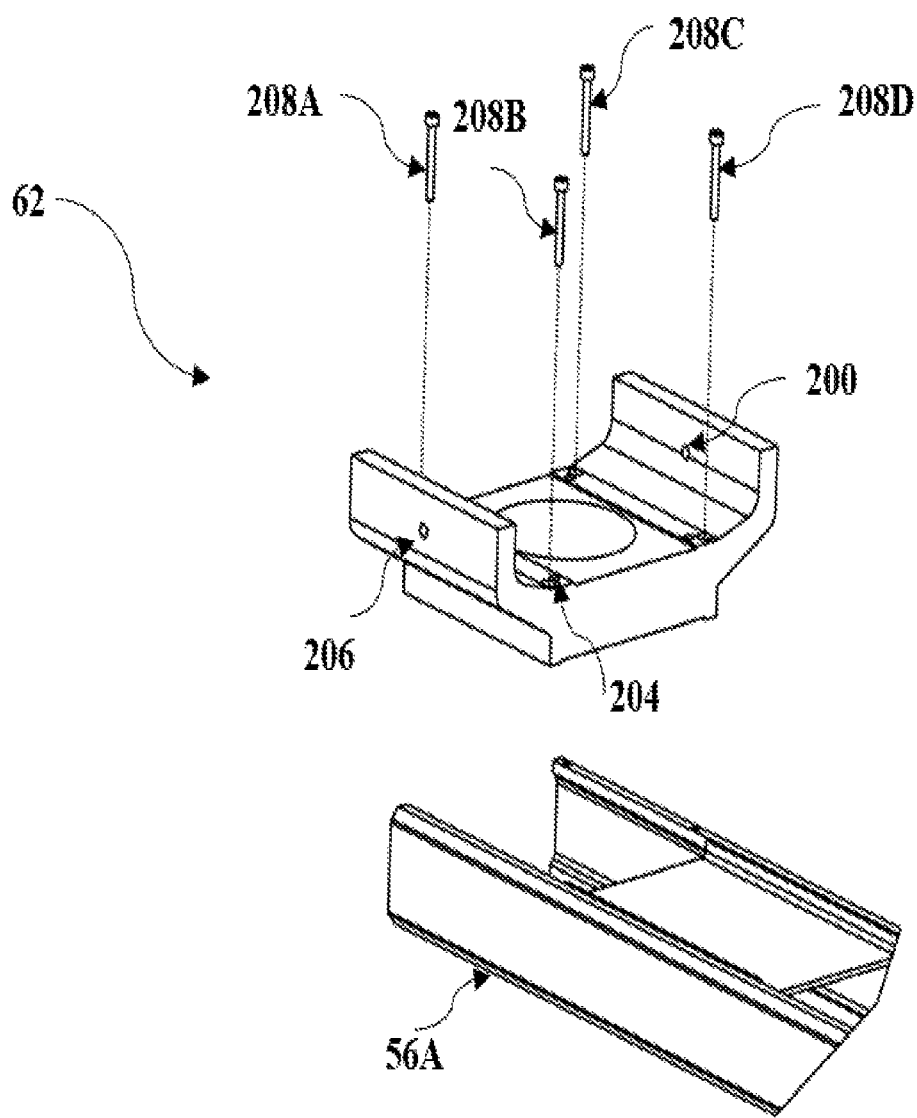
FIG. 4 is a perspective view of a robotic mounting plate as illustrated in FIG. 2 adapted in the apparatus for loading and unloading the freight, according to some embodiments in the present disclosure.

FIG. 4 is a perspective view of a robotic mounting plate as illustrated in FIG. 2 adapted in the apparatus for loading and unloading the freight, according to some embodiments in the present disclosure. The robotic mounting plate 62 is coupled to the telescopic railing 54 employed in the apparatus 11 of the system 10. The robotic mounting plate 62 includes a base plate 204 with two slots, wherein anterior slot of the robotic mounting plate 62 having an anterior threaded slot 206 and the posterior slot of the robotic mounting plate 62 having a posterior threaded slot 200. The base plate 204 includes four slots placed at each edge of the robotic mounting plate 62 with locating screws from 208A to 208D linked to the front end of outer rail 54A of telescopic railings 54. The robotic arm 26B is mounted on the robotic mounting plate 62 placed on the front end of telescopic conveyor 56 such that the robotic arm 26B is operable to lift and place the unit loads 28 from the telescopic conveyor 56 at the positioned target. The robotic arm 26B mounted on the robotic mounting plate 62 is driven by the mechanical connector 64, wherein the mechanical connector 64 enables the telescopic railing 54 to move in relation accordance with the movement of telescopic conveyor 56 either to move the apparatus in forward and backward directions.

Referring now to the drawings FIG. 1A and FIG. 1B describing the working of apparatus for loading of unit loads in freight. The apparatus is driven by Omni drive wheels 50 at a warehouse to position where freight is located. Further, the hydraulic legs 60 of the telescopic conveyor 56 adjusts to align the position of the apparatus 11 of system 10 on the base component 16 such that the hydraulic legs 60 position towards ground retracting the base component 16 and the Omni drive wheels 50 is uplifted from the mobile base platform 24. Further, the apparatus 11 is aligned such that positioned at the center of freight by measuring the distance of walls of the carrying body 12. The telescopic conveyor 56 mounted on top of telescopic railing 54 of the mobile base platform 24 such that the mobile base platform 24 extends to a specific distance towards the inner side of freight. Further, the mechanical connector 64 links the telescopic conveyor 56 and the telescopic railing 54, where the robotic mounting plate 62 is mounted on the telescopic railing 54. The mechanical connector 64 enables the telescopic railing 54 and the telescopic conveyor 56 to move forward based on the movement of telescopic conveyor 56. The robotic arm 26B mounted on the robotic mounting plate 62 of the telescopic railing 54 moves forward in alignment to the freight in relation to the telescopic conveyor 56. Once the apparatus is stable, the robotic arm 26A lifts the unit load 28 from the unit load handler 18 and places on the base conveyor unit 56D of the telescopic conveyor 56. Simultaneously, the robotic arm 26A captures the image of the unit load 28 using a motion capturing device and transmits the information to the control unit 22. The control unit 22 triggers the robotic arm 26B providing an indication to the robotic arm 26B to receive the unit load 28 traveled on the telescopic conveyor 56 towards the robotic arm 26B. The robotic arm 26B processes the information of unit load 28 received from the base conveyor unit 56D to identify the type and size of unit load such that the robotic arm 26B places at the positioned target. Further, the mechanical connector 64 enables the end effector 66 of the robotic arm 26B mounted on the robotic mounting plate 62 to lift the unit load 28 from the outer conveyor unit 56A of telescopic conveyor. The telescopic railing 54 moves backward to retract when the carrying body 11 gets loaded in accordance with the movement of telescopic conveyor 56. The mechanical connector avoids misalignment when the railing units of the telescopic railing 54 is moved in accordance with the conveyor units of the telescopic conveyor 56.

Referring now to the drawings FIG. 1A and FIG. 1B describing the working of apparatus for unloading of unit loads in freight. The apparatus is driven by Omni drive wheels 50 at a warehouse to position where freight is located. The Hydraulic legs 60 of the telescopic conveyor 56 adjusts to align the position of apparatus 11 of the system 10 on the base component 16 such that the hydraulic legs 60 position towards ground retracting the base component 16 and the Omni drive wheels 50 is uplifted from the mobile base platform 24. Further, the apparatus 11 of the system 10 is aligned to position at the center of freight by measuring the distance of walls of the carrying body 12. The telescopic conveyor 56 mounted on top of telescopic railing 54 of the mobile base platform 24, wherein the mobile base platform 24 extends to a specific distance towards the inner side of carrying body 12. Further, the mechanical connector 64 links the telescopic conveyor 56 and the telescopic railing 54 such that the robotic mounting plate 62 mounted on the telescopic railing 54 is moved in relation to the telescopic conveyor 56. The mechanical connector 64 enables the telescopic railing 54 and the telescopic conveyor 56 to move backward based on the movement of telescopic conveyor 56. The robotic arm 26B mounted on the robotic mounting plate of the telescopic railing moves forward in alignment to the freight in relation to the telescopic conveyor 56. Once the apparatus is stable, the robotic arm 26B lifts the unit load 28 from the carrying body 12 and places on the outer conveyor unit 56A of the telescopic conveyor 56. Simultaneously, the robotic arm 26B captures the image of the unit load 28 using a motion capturing device and transmits the information to the control unit 22. The control unit 22 triggers the robotic arm 26A providing an indication to the robotic arm 26A to receive the unit load 28 traveled towards the base conveyor unit 56D of the telescopic conveyor 56. The robotic arm 26A processes the information of unit load 28 received from the outer conveyor unit 56A to identify the type and size of unit load 28 such that the robotic arm 26B is able to lift the unit load from the target position from carrying body and places at the outer conveyor unit 56A of the telescopic conveyor 56. The mechanical connector 64 enables the end effector 66 of the robotic arm 26B mounted on the robotic mounting plate 62 to lift the unit load 28 from the target position and places at the outer conveyor unit 56A of telescopic conveyor 56. The telescopic railing 54 moves forward to retract when the carrying body 11 gets unloaded in accordance with the movement of telescopic conveyor 56. The mechanical connector 64 enables if any misalignment occurred when the railing units of the telescopic railing 54 is moved in accordance with the conveyor units of the telescopic conveyor 56. Further, the unit load travels forward towards the robotic arm 26A and reaches the base conveyor unit 56D of the telescopic conveyor 56. The robotic arm 26A lifts the unit load 28 from the base conveyor unit 56D of telescopic conveyor 56 and places on the unit load handler unit 28 for further handling of unit loads 28 with one or more external sources.

The present disclosure depicting an apparatus of loading and unloading freight provides advantage over the existing systems. As compared to the existing systems, the disclosed apparatus for loading and unloading of freight is provided with technical enhancement that can efficiently perform loading and unloading of unit loads. Eventually automating and maximizing the requirements of loading and unloading of unit loads in warehouse by minimizing cost, and eliminating human labor. This apparatus improves greater productivity rates through consistent throughput where the apparatus can cover multiple shifts offering higher reliability with minimal maintenance requirements and solving the dependency of human interference with proper alignment of the telescopic conveyor and the telescopic railing in the apparatus of system. The mechanical link adapted in the apparatus reduces automated misalignment mechanism for every row filling with unit loads in the carrying body. Also, the apparatus is compact and can be adjustable to any multi sized carrying body thereby reducing cost with greater space for unit loads consumption. The robotic arm mounted on the robotic mounting plate of telescopic conveyor with cantilevered rails connected to the telescopic railing enables the system to be automated. Additionally, this system eliminates errors of misplacing the unit loads according to sequence that improves the factory safety and reduces labor availability dependence that can increase throughput of the warehouse to carry shipments. The apparatus provides no physical contact with the surface of freight in warehouse thereby providing benefit by avoiding any physical damage to the freight. The apparatus having no physical contact with freight gets initially aligned with Omni wheels, wherein the alignment is static in the state till loading and unloading of freight is completed.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An apparatus (11) comprising:
    a mobile base platform (24) includes a front end and a rear end;
    a telescopic railing (54) includes a front end a tail end, wherein the tail end of the telescopic railing (54) is mounted on the front end of the mobile base platform (24);
    a telescopic conveyor (56) coupled to the front end of the telescopic railing, includes a front end and a tail end placed parallel to the telescopic railing (54), wherein the tail end of the telescopic conveyor (56) includes a plurality of hydraulic legs to adjust the tail end of the telescopic conveyor (56) in relation with the mobile base platform (24);
    a mechanical connector (64) adapted to connect the front end of the telescopic conveyor (56) and the front end of the telescopic railing (54); and
    a robotic arm (26B0 mounted on a robotic mounting plate (62) coupled to the front end of the telescopic railing (54), wherein the robotic arm (26B) lifts a unit load (28) among a plurality of unit loads (28) of a freight and positions the lifted unit load (28) on a target position.

2. The apparatus according to claim 1, wherein the mechanical connector (64) includes a head end (100) connected to the front end of the telescopic conveyor (56).

3. The apparatus according to claim 2, wherein the head end (100) includes a first aperture (104) secured to a first aperture (114) of the first parallel (124) end of the front end of the telescopic conveyor (56).

4. The apparatus according to claim 2, wherein the head end (100) includes a second aperture (106) secured to a second aperture (112) of the front end of the telescopic conveyor (56).

5. The apparatus according to claim 1, wherein the mechanical connector (64) includes a tail end (102) secured through an anterior slot (108) of the robotic mounting plate (62) holding the robotic arm (26B).

6. The apparatus according to claim 5, wherein the tail end includes a first aperture, wherein the first aperture is secured through an anterior slot (108) with an anterior threaded slot (206) of the robotic mounting plate (62) using a shoulder stepped screw holding the robotic arm (26B).

7. The apparatus according to claim 1, loading the unit load in telescopic conveyor (56) includes the robotic arm (26 A) lifting the unit load from the unit handler unit (18) and places on the telescopic conveyor (56) in relation with the movement of the tail end of the telescopic railing (54) connected with the tail end of the telescopic conveyor (56) in accordance with the linked mechanical connector (64).

8. The apparatus according to claim 1, unloading the unit load from telescopic conveyor (56) includes the robotic arm (26 B) lifting the unit load from the freight and placing the lifted load in telescopic conveyor (56) in relation with the movement of the tail end of the telescopic railing (54) connected with the tail end of the telescopic conveyor (56) in accordance with the linked mechanical connector (64) and places on the unit handler unit (18).

* * * * *